(12) United States Patent  
Solfrank et al.

(10) Patent No.: US 9,080,638 B2  
(45) Date of Patent: Jul. 14, 2015

(54) UNBALANCED SHAFT AND METHOD FOR PRODUCING SAME

(75) Inventors: Peter Solfrank, Frensdorf (DE); Tobias Mederer, Schwanstetten (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 155 days.

(21) Appl. No.: 13/816,768

(22) PCT Filed: Jul. 7, 2011

(86) PCT No.: PCT/EP2011/061468  
§ 371 (c)(1),  
(2), (4) Date: Feb. 13, 2013

(87) PCT Pub. No.: WO2012/019831  
PCT Pub. Date: Feb. 16, 2012

(65) Prior Publication Data  
US 2014/0311280 A1     Oct. 23, 2014

(30) Foreign Application Priority Data  
Aug. 13, 2010 (DE) .......................... 10 2010 034 289

(51) Int. Cl.  
*F02B 75/06* (2006.01)  
*F16F 15/22* (2006.01)  
*F16F 15/26* (2006.01)

(52) U.S. Cl.  
CPC .............. *F16F 15/22* (2013.01); *F16F 15/267* (2013.01); *F16F 2226/04* (2013.01); *Y10T 29/49679* (2015.01); *Y10T 74/2121* (2015.01)

(58) Field of Classification Search  
USPC ...................... 464/180; 74/570.1, 570.3, 604; 384/447; 123/192.2  
See application file for complete search history.

(56) References Cited

U.S. PATENT DOCUMENTS

| | | | | |
|---|---|---|---|---|
| 738,252 | A * | 9/1903 | Stubbs | 74/570.1 |
| 2,499,485 | A * | 3/1950 | Fransen et al. | 74/570.3 |
| 5,232,322 | A * | 8/1993 | Regensburger | |
| 8,695,555 | B2 * | 4/2014 | Solfrank | 123/192.2 |
| 2009/0308344 | A1 * | 12/2009 | Ihlemann et al. | 123/192.2 |

FOREIGN PATENT DOCUMENTS

DE     102008018545     10/2009

* cited by examiner

*Primary Examiner* — Gregory Binda  
(74) *Attorney, Agent, or Firm* — Volpe and Koenig, P.C.

(57) ABSTRACT

An unbalanced shaft for compensating for inertial forces and/or mass moments of inertia of an internal combustion engine (1), having an unbalanced portion (8), the center of mass of which extends eccentric to the axis of rotation (11) of the unbalanced shaft (6) for generating the shaft imbalance (7), a bearing portion (9) adjacent to the unbalanced portion, and a bearing race (10) joined thereto, the outer surface (13) of which serves as a race for the rolling elements of a roller bearing rotationally supporting the unbalanced shaft, and the inner surface (12) of which retracts radially relative to the outer circumscribed circle (14) of the unbalanced portion in a bearing circumference region running in the direction of the imbalance. In order to assemble the bearing race on the bearing portion, the following geometric relationships are provided: (i) $d2>d1$, (ii) $e>\frac{1}{2}(d2-d1)$, (iii) $e<\frac{1}{2}(d2+d1)$, where $d1$=outer circumscribed circle diameter of the unbalanced portion and the bearing portion, $d2$=inner diameter of the bearing race, and $e$=center point offset between $d2$ and $d1$.

7 Claims, 3 Drawing Sheets

UNBALANCED SHAFT AND METHOD FOR PRODUCING SAME

BACKGROUND

The invention relates to an unbalanced shaft for the compensation of inertial forces and/or mass moments of inertia of an internal combustion engine. The unbalanced shaft comprises an unbalanced portion, the mass center of gravity of which runs eccentrically with respect to the axis of rotation of the unbalanced shaft for generating the shaft imbalance, a bearing portion adjacent to the unbalanced portion and a bearing ring which is attached to this and the outer surface area of which serves as a raceway for the rolling bodies of a rolling bearing rotationally supporting the unbalanced shaft, and the inner surface area of which, in a bearing circumferential region extending in the imbalance direction, is set back radially with respect to the outer enveloping circle of the unbalanced portion. The invention relates, furthermore, to a method for producing such a shaft.

The increasing need to reduce the generation of friction and consequently change over from unbalanced shafts mounted hydro-dynamically on plain bearings to those mounted on rolling bearings for the purpose of the compensation of inertial forces in an internal combustion engine necessitates structural changes to the shafts which take into account the specific rolling load upon the bearing points. The requisite rolling strength can usually only be achieved, in the case of shafts produced in one part, by forging, this production method entailing higher costs, as compared with the cast steel shafts mounted on plain bearings.

A multipart, as it were built-up, unbalanced shaft of the type initially mentioned may be gathered from DE 10 2008 018 545 A1. This proposes a shaft mounted on rolling bearings and made from cast material, with a bearing ring made from rolling bearing steel, and in this case the bearing ring which is partially or completely set back radially with respect to the adjacent unbalanced portion is introduced into the casting die and the shaft material is subsequently cast around it. However, such a method for attaching the bearing ring on the associated bearing portion of the unbalanced shaft may entail some disadvantages. Thus, the introduction of the bearing ring into the casting mold requires a correspondingly adapted casting process. Moreover, the cast-in bearing ring has to be re-machined mechanically for the purpose of its necessary surface quality and has to be retreated thermally for the purpose of the required surface hardness.

SUMMARY

The object on which the present invention is based on specifying an unbalanced shaft of the type initially mentioned, which is mounted on rolling bearings and can be produced at comparatively low outlay, and a corresponding production method.

This object is achieved, in terms of the device, having the features of the invention, and in terms of the method according to the invention. Accordingly, for the purpose of mounting the bearing ring onto the bearing portion, the following geometric relations are to be provided. These make it possible that the shaft is first cast separately from the bearing ring and that the bearing ring, although closed and set back radially with respect to the adjacent unbalanced portion, is subsequently mounted on the shaft.

$$d2 \geq d1 \tag{i}$$

$$e > \tfrac{1}{2}(d2-d1) \tag{ii}$$

$$e < \tfrac{1}{2}(d2+d1) \tag{iii}$$

with $d1$=outer enveloping circle diameter of the unbalanced portion and of the bearing portion,
$d2$=inside diameter of the bearing ring,
$e$=center offset between $d2$ and $d1$.

The inequality (i) has the effect that the bearing ring can be threaded onto the unbalanced portion and displaced axially over the unbalanced portion as far as the bearing portion. In this case, preferably, a clearance fit has to be provided between the inside diameter of the bearing ring and the common outer enveloping circle diameter of the unbalanced portion and of the bearing portion, that is to say $d2>d1$. Nevertheless, depending on the cross-sectional profile of the unbalanced portion, it is also possible to push the bearing ring under elastic deformation over the unbalanced portion, in which case $d2<d1$ would apply.

The inequality (ii) is a measure of the smallest center offset $e$ between the outer enveloping circle diameter $d1$ and the inside diameter $d2$ and reflects the fact that at least the inner surface area of the bearing ring attached to the bearing portion is set back radially with respect to the outer enveloping circle of the unbalanced portion.

The inequality (iii) is a measure of the largest center offset $e$ between the outer enveloping circle diameter $d1$ and the inside diameter $d2$ and indicates the value by which the inner surface area of the bearing ring attached to the bearing portion can be at most set back radially with respect to the outer enveloping circle of the unbalanced portion.

In one development of the invention, the outer surface area of the bearing ring is also to be set back radially with respect to the outer enveloping circle of the unbalanced portion. The following geometric relation then additionally applies:

$$e > \tfrac{1}{2}(d2-d1)+s$$

with
$s$=wall thickness of the bearing ring.

The attachment of the bearing ring to the bearing portion may have a positive action, in that the shaft material adjacent to the bearing ring in said bearing circumferential region is deformed plastically. In this case, the plastically deformed shaft material may surround the outer surface area of the bearing ring in the form of a bead (for example, as a result of caulking) or may engage in each case into one or more recesses on the ring end faces of the bearing ring (for example, as a result of clinching). The bearing ring is expediently comprised of a rolling bearing steel, such as 100Cr6, and, before being mounted, that is to say at the time of attachment, is already hardened and selectively provided with a ready-machined outer surface area.

Alternatively, the attachment of the bearing ring to the bearing portion may have a materially integral action, in that the bearing ring and the bearing portion are connected to one another by means of a welded joint extending in said bearing circumferential region.

Alternatively, the attachment of the bearing ring to the bearing portion may have a nonpositive action, in that the bearing ring and the bearing portion are attached to one another by means of a press fit extending in said bearing circumferential region.

Further alternative fastening methods may be: adhesive bonding, pinning, screwing or wedging of the bearing ring with the bearing portion. In the latter case, there may be provision, on that side of the bearing portion which faces away from the imbalance, for filling the gap relative to the bearing ring with a load-carrying material. This may be, in particular, a plastic which is injected to fill the gap and which, on account of its relatively low density, generates an only low counter-imbalance.

BRIEF DESCRIPTION OF THE DRAWINGS

Further features of the invention may be gathered from the following description and from the drawings in which exemplary embodiments of unbalanced shafts according to the invention are illustrated partially in simplified form or diagrammatically. Unless mentioned otherwise, in this case identical or functionally identical features or components are given the same reference numerals. In the drawings.

DETAILED DESCRIPTION OF THE PREFERRED EMBODIMENTS

Figure 12:
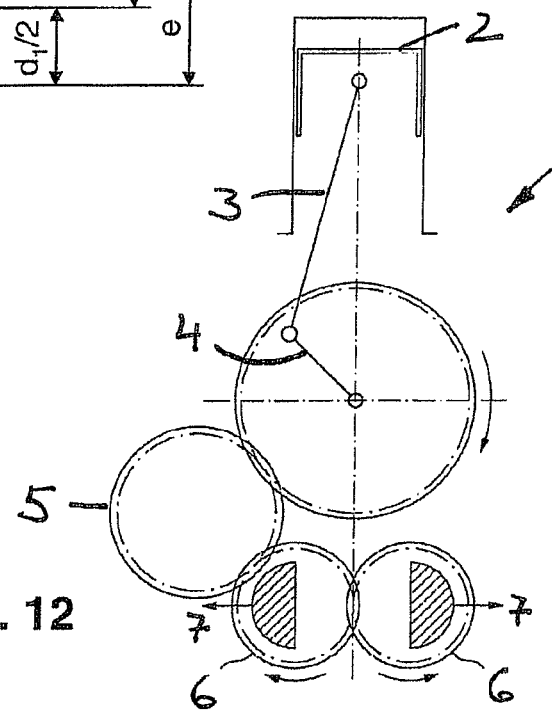
FIG. 12 shows in a diagrammatic illustration an internal combustion engine with known inertia compensation of the second order.

The invention will be explained, starting from FIG. 12 which shows, by means of a transmission diagram, an inertia compensation transmission, also known as a Lancaster differential, of a reciprocating internal combustion engine of the four-cylinder inline type of construction. The internal combustion engine 1 comprises the pistons 2 which oscillate in their cylinders and the longitudinal movement of which is converted by connecting rods 3 into the rotation of the crankshaft 4. The latter, here via an intermediate shaft 5, drives two unbalanced shafts 6 with imbalances 7, the unbalanced shafts 6 rotating contra-directionally, parallel to the crankshaft 4, with double the crankshaft rotational speed, in order to compensate free inertial forces of the second order.

As explained below, the invention provides a built-up unbalanced shaft made from cast steel with a bearing ring which is drawn onto the cast shaft and is attached to a bearing portion and which is made from hardened rolling bearing steel (for example of the sort 100Cr6). The outer surface area of the bearing ring serves as a correspondingly roll-resistant raceway for the rolling bodies of a rolling bearing rotationally supporting the unbalanced shaft and, in particular, of a needle bearing. The unbalanced shaft is configured in such a way that the bearing ring is set back radially with respect to an unbalanced portion adjacent to the bearing portion.

Figure 1:
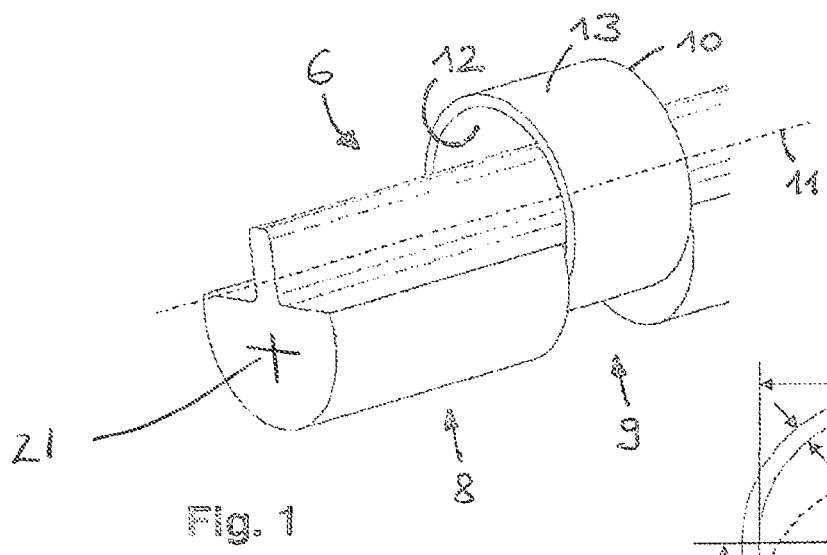
FIG. 1 shows an unbalanced shaft with a bearing ring in the attachment position in a perspective partial illustration.
Figure 2:
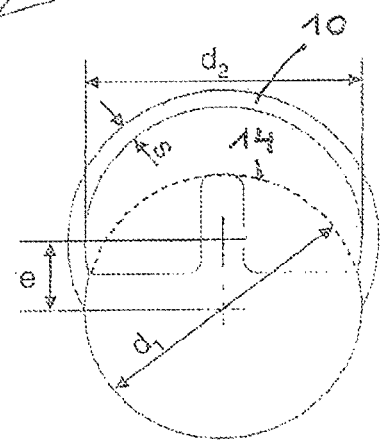
FIG. 2 shows the unbalanced shaft according to FIG. 1 in an axial top view.
Figure 3:
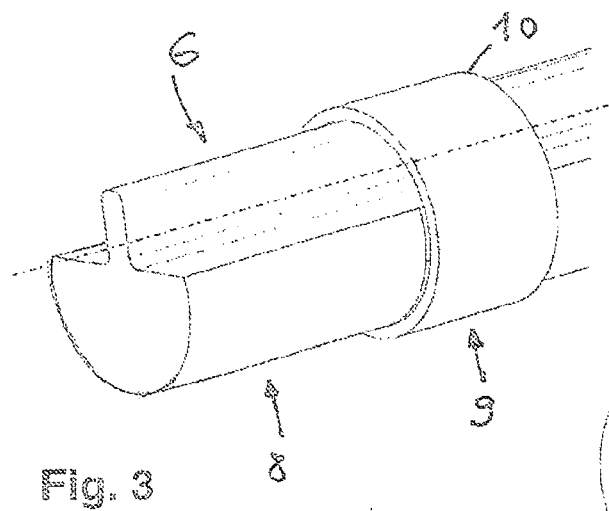
FIG. 3 shows the unbalanced shaft according to FIG. 1 before the bearing ring is displaced radially into its attachment position.

FIGS. 1 and 2 show respectively in perspective and in axial top view part of such an unbalanced shaft 6 with an unbalanced portion 8, with the bearing portion 9 adjacent to it and with the mounted bearing ring 10. To generate the shaft imbalance 7 (see FIG. 12), the mass center of gravity 21 (see FIGS. 1 and 4) of the unbalanced portion 8 runs eccentrically with respect to the axis of rotation 11 of the unbalanced shaft 6. The bearing ring 10 is illustrated in its final attachment position to the bearing portion 9, in which position both the inner surface area 12 and the outer surface area 13 of the bearing ring 10 are set back radially, in the bearing circumferential region extending in the imbalance direction, with respect to the outer enveloping circle 14 of the unbalanced portion 8. The bearing ring 10 reaches this attachment position in that it is first threaded onto the unbalanced portion 8 and is then displaced axially as far as the bearing portion 9 according to FIGS. 3 and 4 and finally radially into its set-back end position according to FIGS. 1 and 2. These movement sequences are basic and relative movements, so that, during a real mounting operation, the bearing ring 10 can also be held fixedly and the shaft 6 moved.

Figure 4:
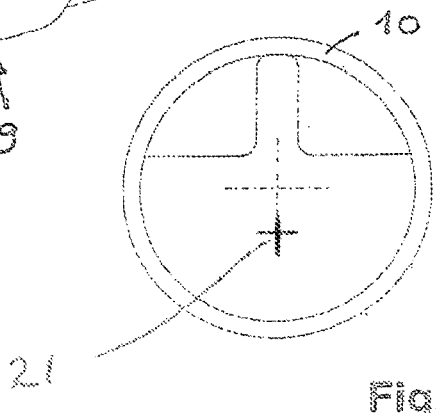
FIG. 4 shows the unbalanced shaft according to FIG. 3 in an axial top view.

A precondition for the mounting method according to the invention is that the inside diameter d2 of the bearing ring 10 is at least as large as the common outer enveloping circle diameter d1 of the bearing portion 9 and of the unbalanced portion 8 on which the bearing ring 10 is displaced. The abovementioned inequality (i): d2≥d1 therefore applies. FIG. 4 illustrates the limiting case where the diameter difference d2−d1 is just such that the bearing ring 10 can be displaced slidingly on the unbalanced portion 8 and the bearing portion 9.

The center offset, designated by e in FIG. 2, between the outer enveloping circle diameter d1 and the inside diameter d2 is a measure of the amount by which the bearing ring 10 attached to the bearing portion 9 is set back radially with respect to the outer enveloping circle 14 of the adjacent unbalanced portion 8. This will be explained with reference to FIGS. 11a to 11c.

Figure 11A:
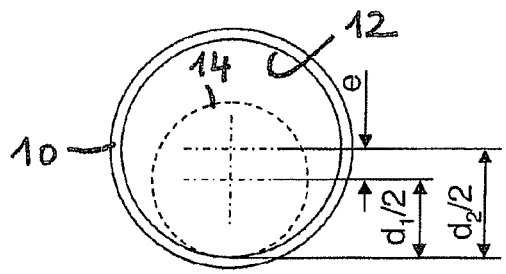
FIG. 11b shows in a diagrammatic illustration the geometric relations which are necessary for mounting the bearing ring onto the bearing portion in a second case.
FIG. 11c shows in a diagrammatic illustration the geometric relations which are necessary for mounting the bearing ring onto the bearing portion in a third case.

FIG. 11a illustrates the lower limiting case of the abovementioned inequality (ii) e>½(d2−d1). The center offset e is so low there that, in the bearing circumferential region extending in the imbalance direction, the inner surface area 12 of the bearing ring 10 is still just set back with respect to the outer enveloping circle 14.

Figure 11B:
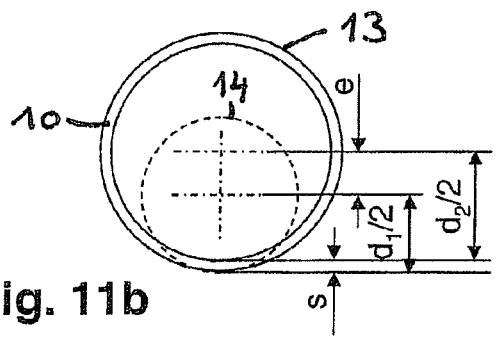

FIG. 11b illustrates the lower limiting case of the abovementioned inequality (iv) e>½(d2−d1)+s. The center offset e is so low there that, in the bearing circumferential region extending in the imbalance direction, the outer surface area 13 of the bearing ring 10 having the wall thickness s is still just set back with respect to the outer enveloping circle 14.

Figure 11C:
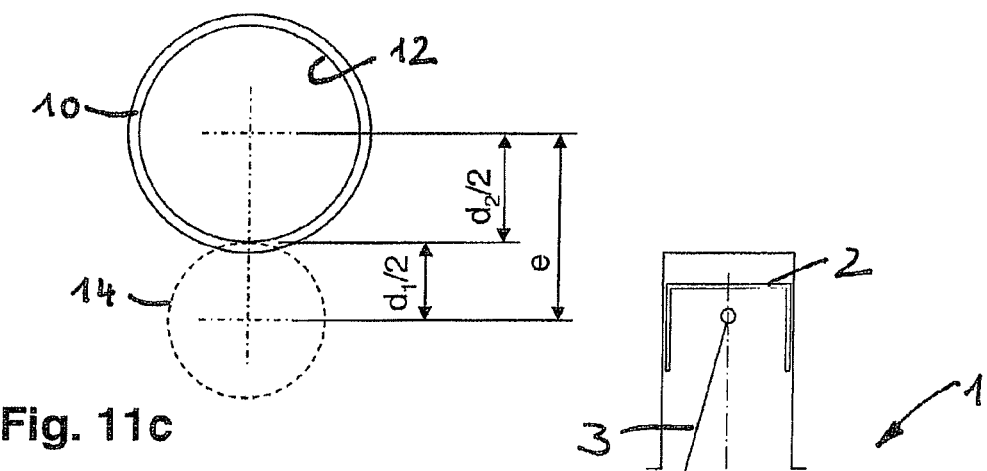

FIG. 11c illustrates the upper limiting case of the abovementioned inequality (iii) e<½(d2+d1). The center offset e is so high there that, diametrically with respect to the bearing circumferential region extending in the imbalance direction, the inner surface area 12 of the bearing ring 10 is still just set back radially with respect to the outer enveloping circle 14.

Figure 5:
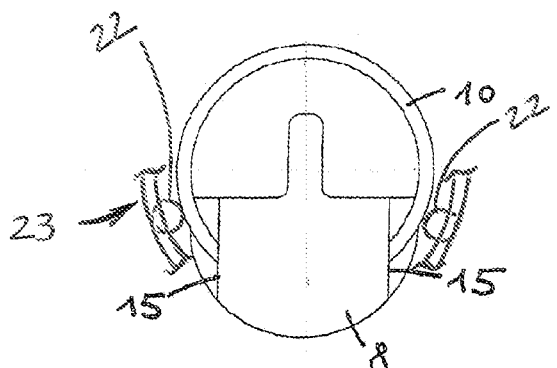
FIG. 5 shows an unbalanced shaft with an alternatively configured unbalanced portion in an axial top view.

The unbalanced portion 8, illustrated in FIG. 5, over which the bearing ring 10 is drawn, has an alternative cross-sectional profile with lateral flattenings 15.

Figure 6:
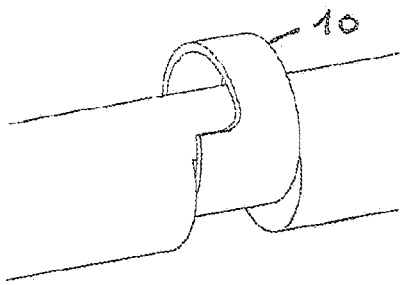
FIG. 6 shows an unbalanced shaft with an alternatively configured bearing ring in a perspective partial illustration.

The bearing ring 10 illustrated in FIG. 6 has a circumferentially variable width which is greater in the bearing circumferential region extending in the imbalance direction and subjected to the highest load there than diametrically opposite this. This has the effect, on the one hand, that the bearing ring 10 likewise contributes to the shaft imbalance 7 (see FIG. 12) and, on the other hand, that the needle rollers 22 (see FIG. 5) of the rolling bearing 23 which roll on the bearing ring 10 and project locally are subjected to lubricant mist occurring during operation. Contrary to that illustrated, the circumferentially variable width may also be mirror-symmetrical with respect to the transverse mid-plane of the bearing ring 10. Alternatively or optionally, for supplying the needle bearing with lubricant, a bore (not illustrated) may also be provided which passes through the bearing ring 10 in the bearing circumferential region subjected to low load.

Figure 7:
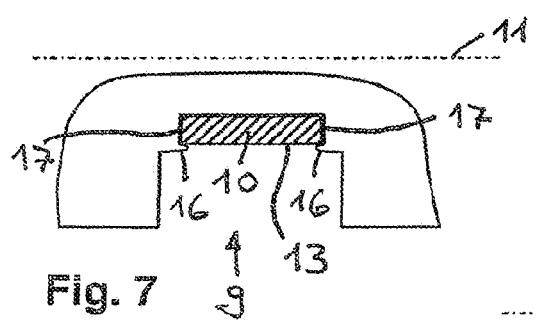
FIG. 7 shows in longitudinal section a first positive attachment connection of the bearing ring on the bearing portion.

FIG. 7 shows a first positive attachment connection of the bearing ring 10 to the bearing portion 9. In the bearing circumferential region extending in the imbalance direction, the shaft material adjacent to the bearing ring 10 is deformed plastically by caulking into beads 16 which engage around the outer surface area 13 of the bearing ring 10 in the region of the ring end faces 17 of the latter.

Figure 8:
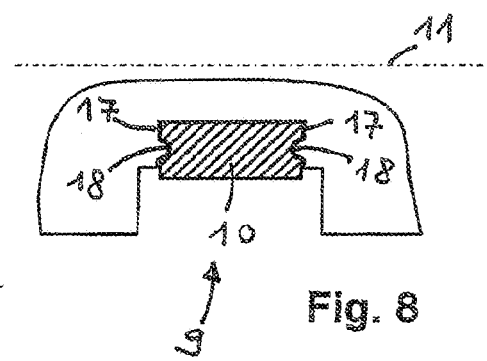
FIG. 8 shows in longitudinal section a second positive attachment connection of the bearing ring on the bearing portion.

FIG. 8 shows a second positive attachment connection of the bearing ring 10 to the bearing portion 9. The wall thickness s (see FIG. 2) of the bearing ring 10 is comparatively large here, and its ring end faces 17 are provided with recesses in each case in the form of a peripheral groove 18, into which the shaft material, in this case deformed plastically by means of clinching, engages.

Figure 9:
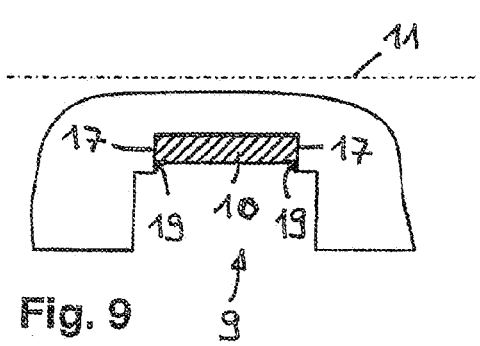
FIG. 9 shows in longitudinal section a materially integral attachment connection of the bearing ring on the bearing portion.

FIG. 9 shows a materially integral attachment connection of the bearing ring 10 to the bearing portion 9 which are connected to one another in the region of the ring end faces 17 of the bearing ring 10 by means of weld seams 19.

Figure 10:
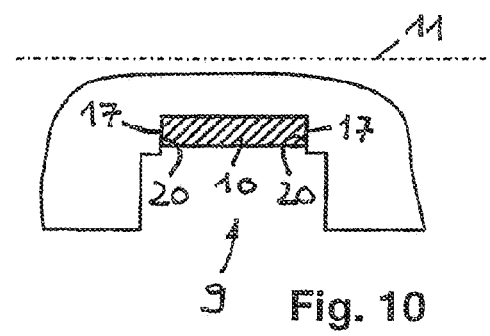
FIG. 10 shows in longitudinal section a nonpositive attachment connection of the bearing ring on the bearing portion, FIG. 11a show in a diagrammatic illustration the geometric relations which are necessary for mounting the bearing ring onto the bearing portion in a first case.

FIG. 10 shows a nonpositive attachment connection of the bearing ring 10 to the bearing portion 9. In the bearing circumferential region extending in the imbalance direction, the ring end faces 17 of the bearing ring 10 and axial end faces 20 of the bearing portion 9 which receive these are attached by means of an axial press fit. The attachment process may be assisted thermally in that the bearing portion 9 is heated and/or the bearing ring 10 is cooled.

LIST OF REFERENCE NUMERALS

1 Internal combustion engine
2 Piston
3 Connecting rod
4 Crankshaft
5 Intermediate shaft
6 Unbalanced shaft
7 Imbalance
8 Unbalanced portion
9 Bearing portion
10 Bearing ring
11 Axis of rotation of the unbalanced shaft
12 Inner surface area of the bearing ring
13 Outer surface area of the bearing ring
14 Outer enveloping circle
15 Flattening
16 Bead
17 Ring end face of the bearing ring
18 Groove
19 Weld seam
20 Axial end face

The invention claimed is:

1. An unbalanced shaft for the compensation of at least one of inertial forces or mass moments of inertia of an internal combustion engine, comprising:
an unbalanced portion, a mass center of gravity of which runs eccentrically with respect to an axis of rotation of the unbalanced shaft for generating a shaft imbalance,
a bearing portion adjacent to the unbalanced portion, and
a bearing ring which is attached to the bearing portion and an outer surface area of the bearing ring serves as a raceway for rolling bodies of a rolling bearing rotationally supporting the unbalanced shaft and an inner surface area of which, in a bearing circumferential region extending in an imbalance direction, is set back radially with respect to an outer enveloping circle of the unbalanced portion, and for the purpose of mounting the bearing ring onto the bearing portion, the following geometric relations are provided:

$$d2 \geq d1 \quad \text{(i)}$$

$$e > \tfrac{1}{2}(d2 - d1) \quad \text{(ii)}$$

$$e < \tfrac{1}{2}(d2 + d1) \quad \text{(iii)}$$

with
d1=an outer enveloping circle diameter of the unbalanced portion and of the bearing portion,
d2=an inside diameter of the bearing ring, and
e=a center offset between d2 and d1.

2. The unbalanced shaft as claimed in claim 1, wherein the outer surface area of the bearing ring is also set back radially with respect to the outer enveloping circle of the unbalanced portion, where the following geometric relation applies:

$$e > \tfrac{1}{2}(d2 - d1) + s \quad \text{(iv)}$$

with
s=a wall thickness of the bearing ring.

3. The unbalanced shaft as claimed in claim 1, wherein the bearing ring and the bearing portion are attached positively to one another by plastic deformation of the shaft material adjacent to the bearing ring in said bearing circumferential region.

4. The unbalanced shaft as claimed in claim 3, wherein a plastically deformed shaft material surrounds the outer surface area of the bearing ring in the form of a bead.

5. The unbalanced shaft as claimed in claim 3, wherein a plastically deformed shaft material engages in each case into one or more recesses on ring end faces of the bearing ring.

6. The unbalanced shaft as claimed in claim 1, wherein the bearing ring and the bearing portion are attached to one another in a materially integral manner by a welded joint extending in said bearing circumferential region.

7. The unbalanced shaft as claimed in claim 1, wherein the bearing ring and the bearing portion are attached nonpositively to one another by a press fit extending in said bearing circumferential region.

* * * * *